March 4, 1930.  R. J. POMEROY  1,749,301
SOUND PRODUCING AND CONTROLLING SYSTEM
Filed July 23, 1927  4 Sheets-Sheet 2
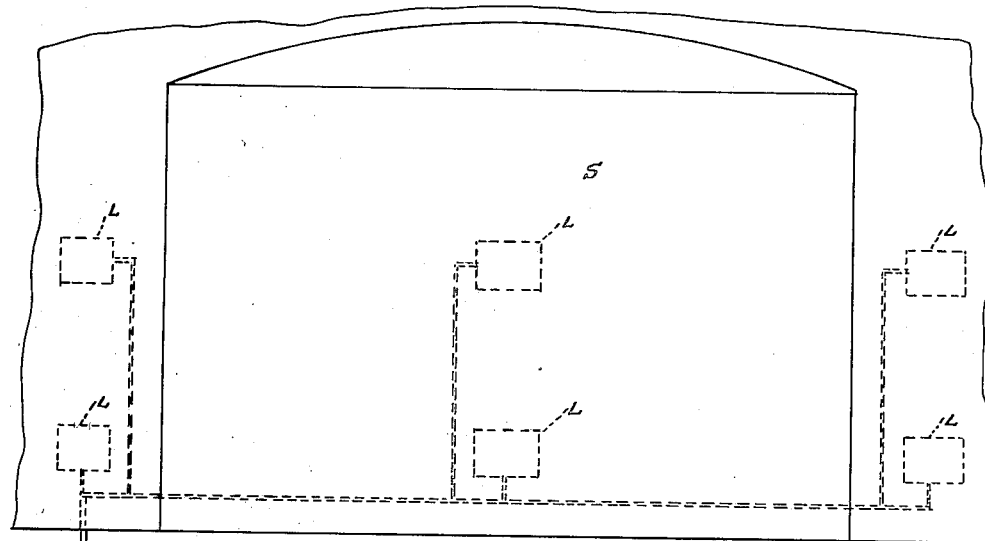
Fig. 2.
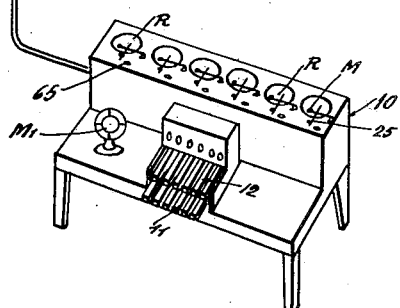
Inventor.
Roy J. Pomeroy.
Attorney.

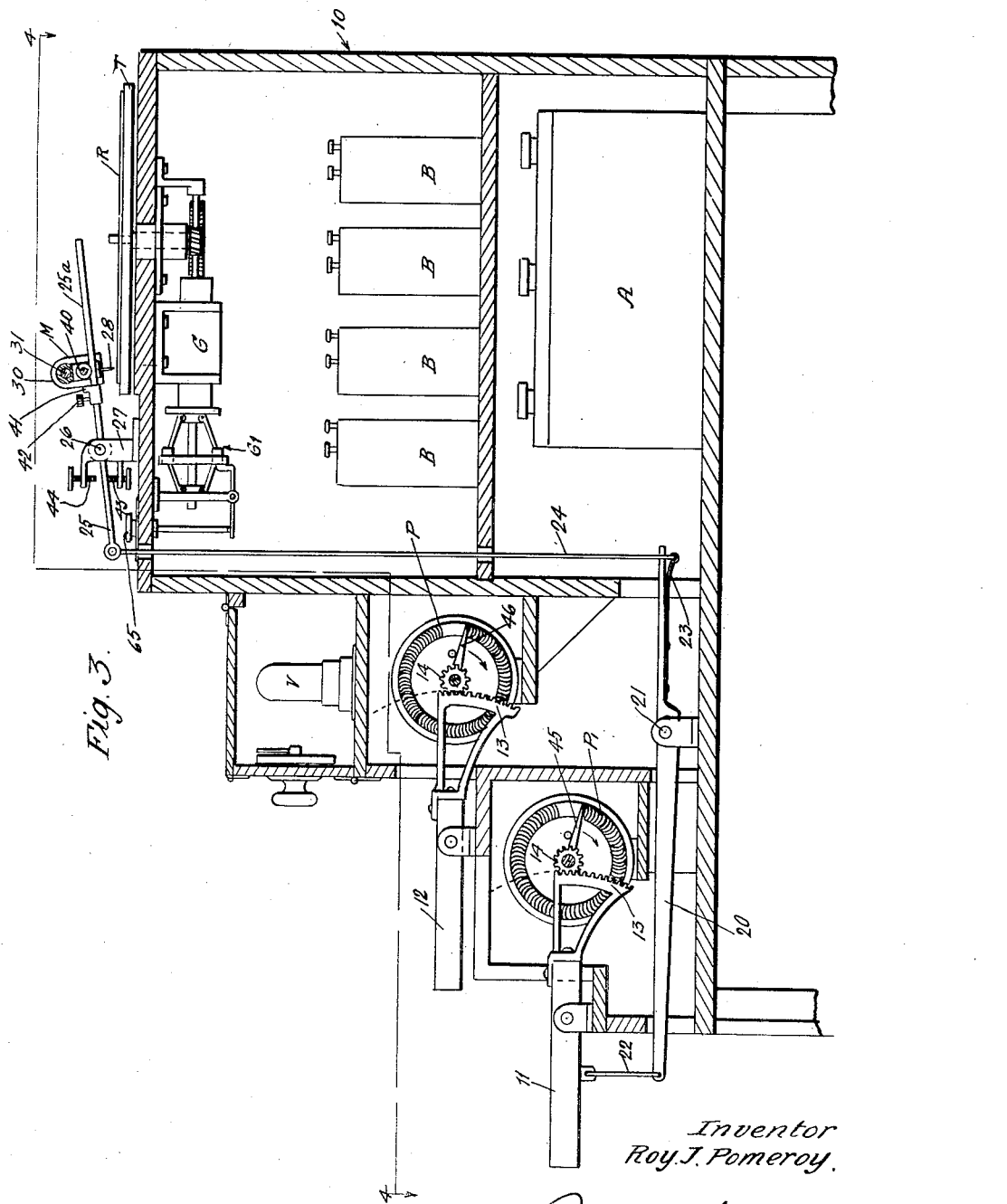

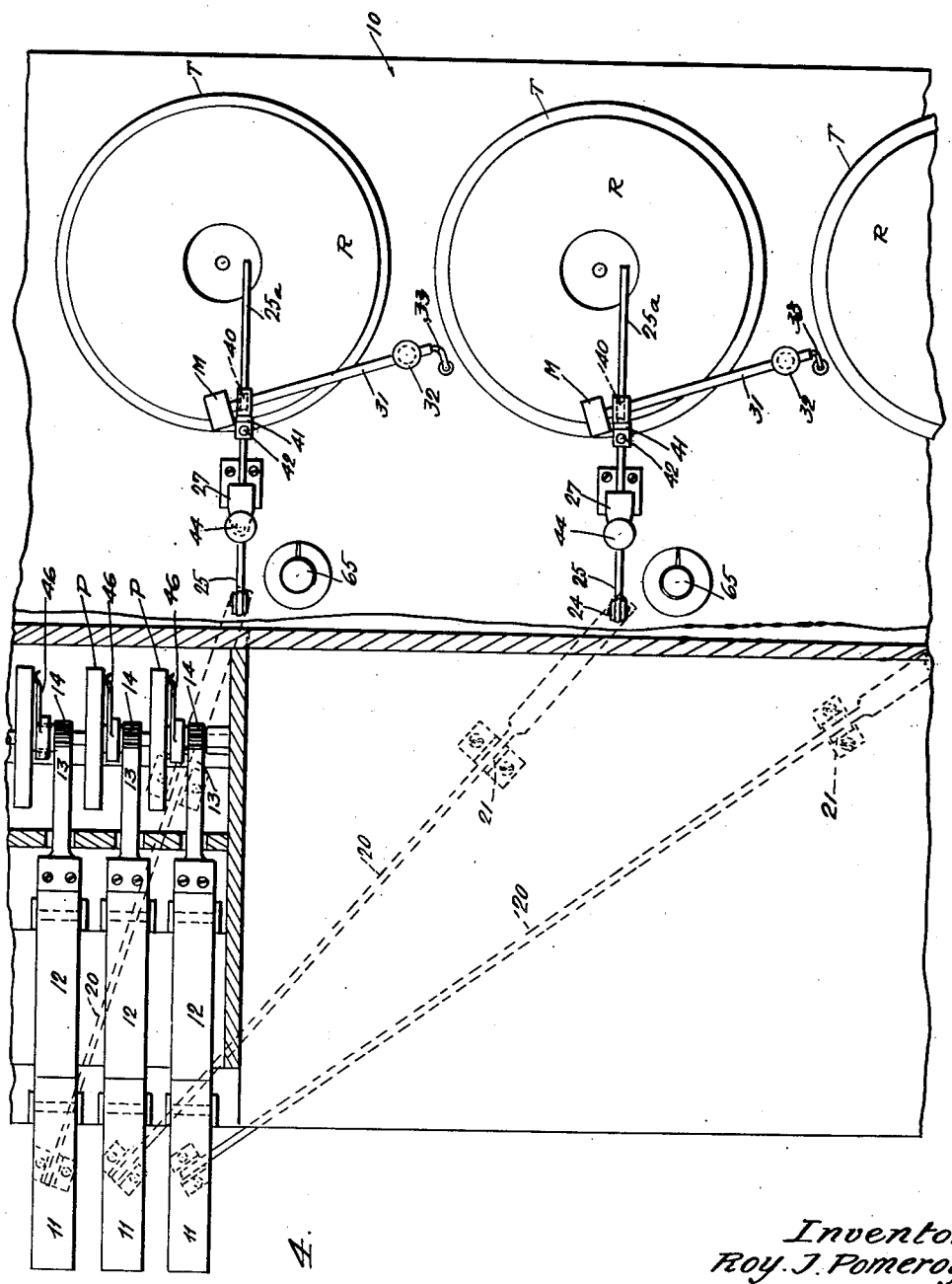

Patented Mar. 4, 1930

1,749,301

UNITED STATES PATENT OFFICE

ROY J. POMEROY, OF LOS ANGELES, CALIFORNIA, ASSIGNOR OF ONE-HALF TO PARAMOUNT FAMOUS LASKY CORPORATION, OF LOS ANGELES, CALIFORNIA, A CORPORATION OF NEW YORK

SOUND PRODUCING AND CONTROLLING SYSTEM

Application filed July 23, 1927. Serial No. 208,039.

This invention has general reference to the production and control of selected sound effects; the present typical embodiment of the invention relating more particularly to the production and control of selected sound effects to accompany a motion picture. Although the invention is not limited to use in connection with motion pictures, it is best explained in that connection and therefore, but without limitation thereto, the following detailed specification deals with mechanism and system for producing and controlling sounds to accompany the exhibition of a motion picture.

It has heretofore been proposed to use collections of sound producing devices, sometimes aggregated within a single cabinet, for producing a variety of appropriate sounds and noises to accompany a play or other production. Such devices, however, have, in proportion to the variety of sounds producible, been large and cumbersome and unwieldy to move about. It is a primary object of this invention to provide an apparatus and system whereby any variety of selected sounds and noises may be controllably produced from an apparatus comparatively small in size; and furthermore to produce such an apparatus and system wherein, by simple substitution of appropriate records, an unlimited variety of sounds may be produced.

The system depends primarily for its efficacy on the use of a plurality of sound records, typically phonograph records, on which have been recorded the desired sounds to be used in any particular production. And, given the selected sound records, the system of the present invention embodies means for controllably reproducing those selected sounds and amplifying them to any desired degree. And in addition to control as to synchronism with the production of a play, the system embodies control not only as to degree of amplification but also as to apparent source, pitch, etc.

The invention will be best understood from the following detailed specification of a present, illustrative and preferred form of the system and apparatus, reference for this purpose being had to the accompanying drawings, in which:

Fig. 2 is a diagrammatic perspective illustrating the installation and use of the system;

Fig. 3 is a vertical cross-section of the control apparatus shown in Fig. 2; and Fig. 4 is a plan section taken on line 4—4 of Fig. 3.

Figure 1:
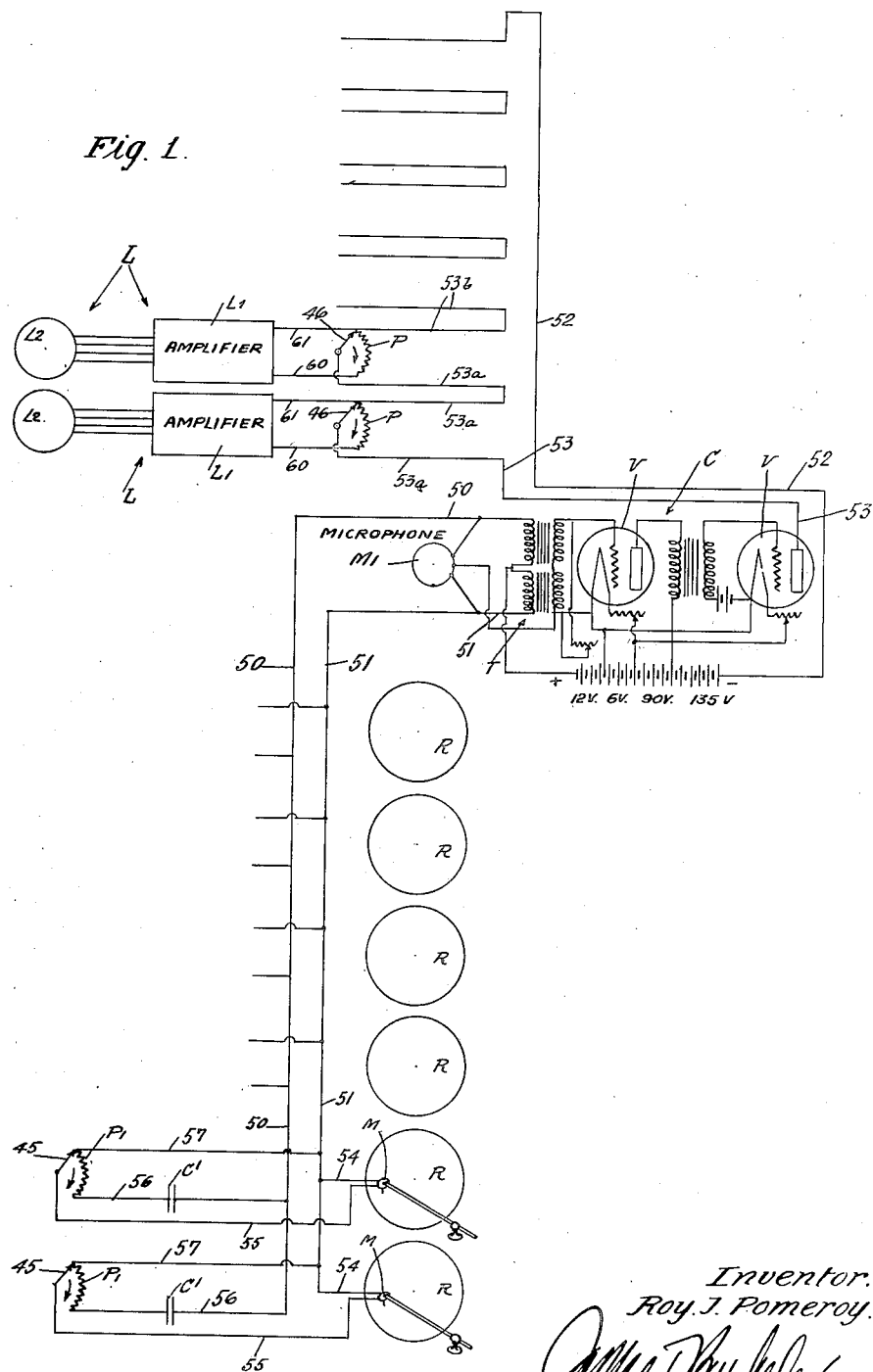
Fig. 1 is a diagram showing a typical electrical circuiting for the whole system.

In a typical installation of the system and apparatus a control mechanism designated generally by the letter C in Fig. 2 will be installed in a theatre at any advantageous position, and, for instance, behind the stage proscenium, instanced in this particular showing by the motion picture screen S, there may be installed a suitable number of amplifying and loud speaker units L, the nature of which will be hereinafter described. It will be understood that these units L may be installed in a theatre in any relative positions; but typically for the purpose of motion picture reproduction they may be installed behind the screen in spaced locations so that the successive production of sound first in one and then in another may heighten the illusion of sound proceeding from an apparent moving source of sound.

Referring now more particularly to Figs. 1, 3 and 4, there may be conveniently provided a cabinet 10 within which the major portion of the sound producing and control apparatus is assembled. I have shown this cabinet in a form that now appears to be convenient and containing an arrangement of apparatus that now appears most convenient; but it will be understood that the particular form and arrangement of the cabinet and its apparatus is not necessarily a limitation upon the invention. For sake of convenience the rotating tables T, in suitable number, which carry the phonograph records R, are mounted on the top of the cabinet 10 in a position where the records may be changed readily; and the two banks of control keys 11 and 12 are mounted at a lower elevation in the forward part of the cabinet. In each bank of control keys 11 and 12 there will be as many keys as there are record tables and records, and loud speakers, respectively; in this particular illustration I have chosen to show six such record tables and records, and loud speakers, and therefore six keys in each control bank. The cabinet may also be so constructed as to be capable of holding the batteries A and B; also the vacuum tubes V of the primary amplifying set, as also the resistances P¹ of that set, together with the other apparatus of the initial amplifying set which is described later.

Each key 12 of the upper bank is mechanically connected through rack 13 and pinion 14 to operate a potentiometer P; these several potentiometers being included respectively in the several circuits that go to the amplifying and loud speaker sets L from the output circuit of amplifier C. Each of the keys 11 of the lower bank are mechanically connected through similar racks 13 and pinions 14 to operate potentiometers P¹ which form a part of the circuiting connections leading from the magnetic pick-ups M of the several phonograph records to the input circuit of the initial amplifying set C. Also mechanically connected to and operated by each key 11 of the lower bank there is a mechanical control means for the reproducer or magnetic pick-up of each of the records R; and the mechanism for this purpose typically embodies the following described parts. One end of lever 20 pivoted at 21 is connected by link 22 to key 11. A take-up spring 23 is mounted upon the other end of the lever and to this take-up spring a link 24 is connected, link 24 connecting to one end of the lever 25 which is pivoted at 26 on a standard 27 mounted on top the cabinet. The other end 25ª of lever 25 extends over a record R on a table T in each instance, and the magnetic pick-up M rides lever arm 25ª in such a manner that when that lever arm is moved down from a position shown in Fig. 3 the record engaging needle 28 is dropped into operative engagement with the record. For the purposes of my present system I preferably employ a well known type of magnetic pick-up M which embodies a small case 30 mounted on one end of a tube 31 which at or near its other end is mounted universally in a supporting standard 32, so that the needle 28, which is mounted in a needle holder projecting from case 30, may float both vertically and horizontally to follow the record groove as the record rotates. In this type of magnetic pick-up the undulating electric current is carried off from the pick-up through a cable 33 which runs out through tube 31, the cable embodying two connecting wires whose location in my system will be described later.

The pick-up arm 31 has mounted on it a roller 40 which rides lever arm 25ª; so that when the lever arm is tipped up as shown in Fig. 3 the magnetic pick-up will move to the left in that figure until it comes up against a stop 41 which is adjustably mounted on lever arm 25ª and set in any adjusted position with a set screw 42; this stop being set in such position that when lever arm 25ª is lowered the pick up needle 28 will be lowered into the beginning end, or any other selected part, of the record sound groove. An adjustable stop screw 43 limits the tilted position of lever 25 and another adjustable stop screw 44 limits the downward movement of lever arm 25ª. When a key 11 is depressed, the first part of its movement causes the motion of lever 25 in the direction indicated by the arrow in Fig. 3, the lever arm 25ª being sufficiently depressed by a short downward movement of key 11 so that needle 28 is lowered onto the record and lever arm 25ª is moved down slightly away from roller 40, so as to leave the magnetic pick-up with its needle free to float over the record. In this position the left hand end of lever 25 (in Fig. 3) has moved up against stop screw 44. This action takes place during the first part of the depression of key 11; and all further relative movement of key 11 for the purpose of operating potentiometer P¹ is taken up by spring 23 without moving lever 25 any further. Further depression of key 11 therefore merely operates potentiometer P¹ to throw its arm 45 around in the direction indicated by the arrow, with the result, as hereinafter explained, of increasing the input current to the initial amplifying apparatus and therefore of increasing the volume of sound delivered from that amplifying apparatus from the in-put coming from any particular record.

Each key 12 simply operates its connected potentiometer P, each key when depressed throwing the connected potentiometer arm 46 around in the direction indicated by the arrows with the result as hereinafter explained, of throwing the audio-frequency current from the initial amplifying set to any selected one or more of the final amplifying and loud speaker units L, and also of controlling the amplification and intensity of the sound delivered by the loud speakers.

In Fig. 1 the electrical circuiting of the typical complete system is shown in diagram. The several phonograph records are indicated at R. The electrical connections, for purposes of simplicity of illustration, of only two of the magnetic pick-ups M are illustrated in Fig. 1; likewise the connections of only two of the amplifying and loud speaker units L are shown. In the diagram the input circuit to the initial amplifying set C is shown as composed of the two lead-in conductors 50 and 51, these lead-in conductors leading initially to the transformer T which feeds to any suitable amplifying apparatus out of which the two output conductors 52 and 53 lead to the several final amplifying and loud speaker sets L. A typical vacuum tube amplifying set is illustrated in the drawings, but will need no further explanation here as such sets are well understood in the art.

Each magnetic pick-up M is connected into the input circuit 50, 51 as typically shown in Fig. 1. For instance a conductor 54 connects one side of each magnetic pick-up to the input conductor 51. The other side of each magnetic pick-up is connected by wire 55 to arm 45 of the corresponding potentiometer $P^1$. One side of the resistance wire of the potentiometer is connected by wire 56 through a condenser $C^1$ to the other input conductor 50; while the other side of said resistance is connected by wire 57 to the input conductor 51. The arrangement is such, as will be readily recognized from a consideration of Fig. 1, that when the potentiometer arms 45 are in their normal positions, the positions indicated in Figs. 1 and 3, the current generated in the magnetic pick-ups will be short circuited; and as any potentiometer arm 45 is thrown around in the direction indicated by the arrow the current generated in the corresponding magnetic pick-up will be diverted more and more largely to the input circuit of conductors 50 and 51. Consequently as any selected key is depressed, the first action is to throw the corresponding magnetic pick-up into operative contact with its record and effectively connect it with the input circuit, further depression of the key increasing the proportion of current thrown to the input circuit 50, 51 and thus correspondingly increasing the amount of output current on the output circuit 52, 53 leading from the amplifying set C.

Each amplifying and loud speaker unit L may comprise an individual amplifying set $L^1$ and a loud speaker $L^2$. From the output circuit conductor 53 a conductor $53^a$ leads to arm 46 of one of the potentiometers P. With this potentiometer arm in its normal position the current goes directly and wholly to wire $53^a$ which leads to the next potentiometer arm 46; and thence, in the normal position of that potentiometer arm, the circuit goes on through wire $53^b$ to the next potentiometer arm and so on through the whole series without operating any of the amplifying and loud speaker sets L. The two conductors 60 and 61 that lead to the several amplifiers $L^1$ are connected to opposite sides of the resistance of the corresponding potentiometer P; so that as will be readily seen from an inspection of the diagram, as any one of the potentiometer arms 46 is thrown around in the direction indicated by the arrow an increasing proportion of the current flowing in the output circuit 52, 53 will be thrown through the corresponding amplifier $L^1$. And as will be now understood, by a proper manipulation of keys 12 the audio current coming from the common amplifying set C may be thrown to any desired degree into any one or more of the amplifying and loud speaker sets L so as to cause the finally produced sound to emanate from any selected apparent source. And the audio current coming from the amplifying set C will represent and reproduce sounds from any selected combination of them.

All of the apparatus herein described, with the exception of the amplifier and loud speaker sets L, may be contained within or upon the cabinet 10. For convenience of installation a cable D may lead from the cabinet 10 and will contain all of the conductors 60, 61; these various conductors leading to their proper sets L which may be installed in any selected and relative locations. For convenience in setting up the complete system in any theater the wires in cable D may be properly numbered or otherwise designated in conformance with some numbered or other designation of the several sets L, all as will be well understood.

Each record table may be driven by any suitable motor mechanism, such as indicated at G in Fig. 3. Such a motor mechanism will typically embody a speed governor $G^1$ controllable and adjustable by a speed control button 65 so that the speed of each record may be individually set and individually controlled if desired during operation. The records' speed may thus be controlled to suit any particular record placed upon a table, and may also be controlled if desired to raise or lower the pitch of the sounds emanating from that particular record.

It will be understood that the apparatus herein described, although equipped with only six record tables, is not in the least limited to use and operation of only six records, as others may be substituted from time to time without breaking the continuity of sound reproduction.

Given a proper selection of records, it will be seen from what I have before said that my system enables the operator not only to reproduce selected sounds and noises at chosen times, but also at will to change and vary the point of apparent sound source as also the intensity and pitch of such sounds. By proper manipulation of the keys 11 the synchronism as well as the intensity of the various sounds, to suit the accompanying production, are completely under control. And within the limit of the number of records which may be at any time placed in the apparatus, any desired combination of sounds may be produced. And, at any time, the pitch of any one or more of the sounds may be varied by operating the governor regulator, or the operator may control the pitch by applying his hand to the record or record table, the records being in a position convenient for such control. Then the operator may also completely control the apparent sound source by operating the several keys 12; operating them so that the sound is finally produced from any one selected loud speaker or from any combination of them. For instance if in the production the object supposed to emit the sounds is moving across the stage, the sound source illusion may be greatly heightened by causing the sound first to be delivered from one loud speaker and then from an adjacent one, the first loud speaker being gradually cut down in intensity as the second one is increased. Many such possible combinations of sound reproduction occur to operators familiar with stage plays and need not here be explained in detail. The system also provides for the connection of a microphone M—1 so that the operator or other person may either speak or produce any desired sounds or noises through the loud speakers.

I claim:

1. In a sound producing and controlling system, the combination of a plurality of independently controllable sound record operating means each adapted to move a sound record at independently selected speed, a reproducing element for each of such records, an amplifying system connectible with said reproducing elements, means for selectively throwing any selected reproducing element into operative relation with its respective record, and means controlled thereby for connecting that selected reproducing element with the sound amplifying means and for independently controllably varying the input from each reproducing element to the amplifying system.

2. In a sound producing and controlling system, the combination of a plurality of independently controllable sound record operating means each adapted to move a sound record at independently selected speed, a reproducing element for each of such records, an amplifying means connectible with said reproducing elements, and means including, and operable by movement of, a single key and adapted to throw a reproducing element into operative association with its respective record, to connect said reproducing element with the sound amplifying means and independently to controllably vary the input from each reproducing element to the amplifying system.

3. In a sound producing and controlling system, the combination of a plurality of independently controllable sound record operating means each adapted to move a sound record at independently selected speed, a reproducing element for each of such records, an electrical sound amplifying system, an operating key for each of the reproducing elements, mechanical means operated from each of said keys to raise and lower the corresponding sound reproducing element with respect to its corresponding record, and a controlling rheostat mechanically connected with each of said keys and adapted to be operated thereby to connect the corresponding reproducing element with the amplifying system and independently to controllably vary the input from each reproducing element to the amplifying system.

4. In a sound producing and controlling system, the combination of a plurality of independently controllable sound record operating means each adapted to move a sound record at independently selected speed, a reproducing element for each of such records, an electrical amplifying system having a single input circuit to which each of the reproducing elements may be connected, an individual circuit for each of the reproducing elements connecting into said input circuit and each including a controlling rheostat, an operating key for each of the reproducing elements, said key being operatively connected to its corresponding reproducing element to move it into and out of operative relation to its respective record and said key being also operatively connected to the corresponding rheostat for its operation.

5. In a sound producing and controlling system, the combination of a plurality of independently controllable sound record operating means each adapted to move a sound record at independently selected speed, a reproducing element for each of such records, an electrical amplifying system having a single input circuit to which each of the reproducing elements may be connected, an individual circuit for each of the reproducing elements connecting into said input circuit and each including a controlling rheostat, an operating key for each of the reproducing elements, a mechanical connection between each of said operating keys and the corresponding rheostat for operation of the rheostat by depression of the key, and mechanical connective means between each key and the corresponding reproducing element whereby the first depression of such key moves the corresponding reproducing element into operative relation to its respective record.

6. In a sound producing and controlling system, the combination of a plurality of sound record operating means each adapted to move a sound record, a reproducing element for each of such records, an electrical amplifying system having a single input circuit to which each of the reproducing elements may be connected, individual circuits for each of the reproducing elements connecting into said input circuit and each including a controlling rheostat, an operating key for each of the reproducing elements, said key being operatively connected to its corresponding reproducing element to move it into and out of operative relation to its respective record and also operatively connected to the corresponding rheostat for its operation; said amplifying system having a single output circuit, a plurality of speakers, individual circuits for each speaker connecting into said output circuit and each including a controlling rheostat, and operating keys for selectively operating said controlling rheostats.

7. In apparatus of the character described, a frame, a plurality of record receiving tables and means for individually operating said tables, a corresponding number of reproducing elements each adapted for cooperation with one such record, a pivoted arm adapted to be raised and lowered under the reproducing element to raise and lower it with respect to its record, stops to limit movement of said arm, an operating key, mechanical connection between said key and said arm including a yielding take-up which allows motion of the key after the arm has been stopped in its motion, a circuit for the reproducing element, and a controlling rheostat in said circuit and mechanically connected with the key to be operated thereby.

In witness that I claim the foregoing I have hereunto subscribed my name this 22nd day of July, 1927.

ROY J. POMEROY.